Oct. 7, 1952      E. H. BRITT      2,612,815
BOTTLE OR CONTAINER INSPECTION APPARATUS
Filed Oct. 30, 1946      3 Sheets-Sheet 1
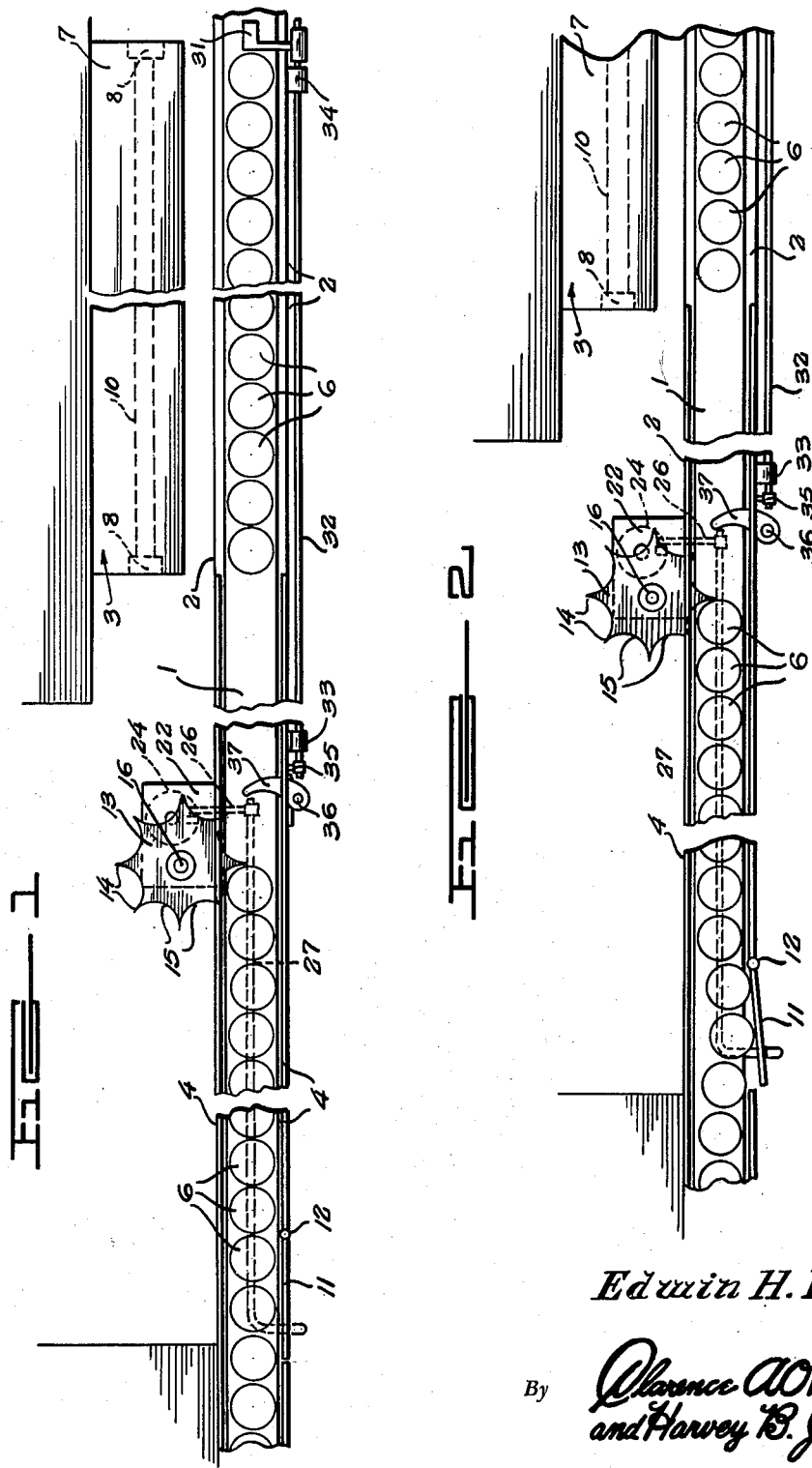
Inventor
*Edwin H. Britt*
By *Clarence A. O'Brien
and Harvey B. Jacobson*
Attorneys

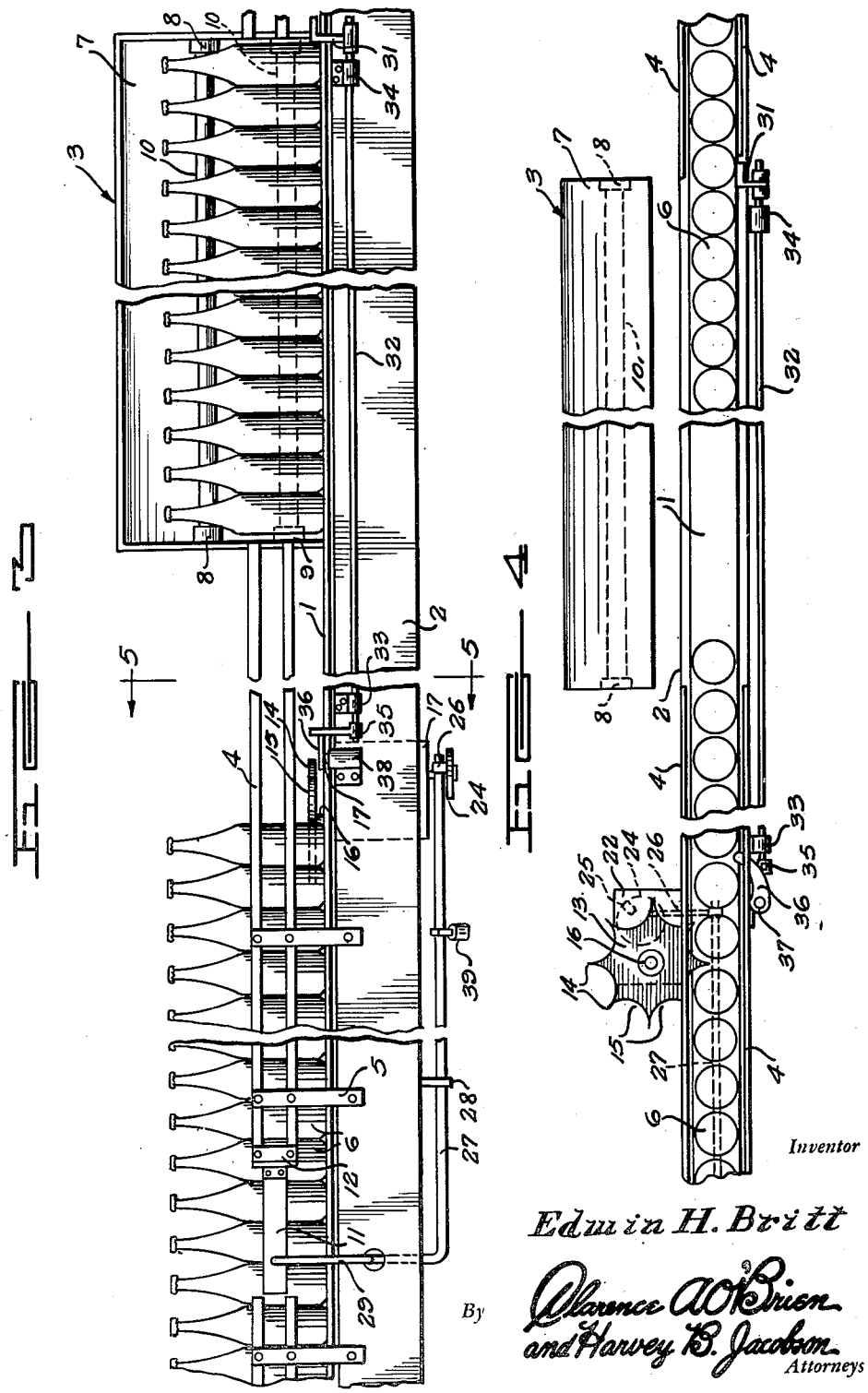

Oct. 7, 1952 — E. H. BRITT — 2,612,815
BOTTLE OR CONTAINER INSPECTION APPARATUS
Filed Oct. 30, 1946 — 3 Sheets-Sheet 3
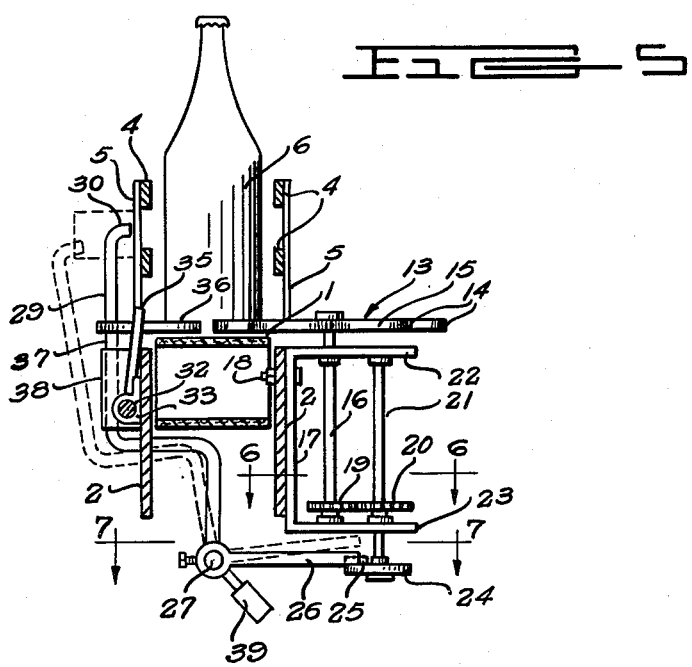
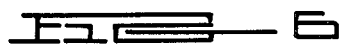
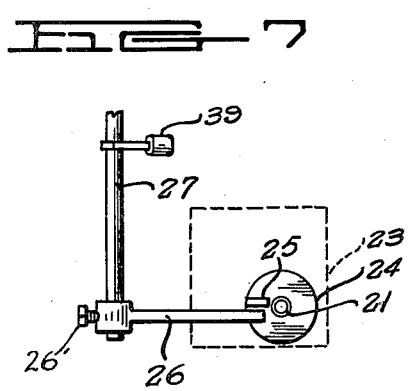
Inventor
Edwin H. Britt
By Clarence A. O'Brien
and Harvey B. Jacobson
Attorneys Patented Oct. 7, 1952

2,612,815

UNITED STATES PATENT OFFICE 2,612,815

BOTTLE OR CONTAINER INSPECTION APPARATUS

Edwin H. Britt, Raleigh, N. C., assignor, by mesne assignments, to Harris Foundry and Machine Company, Cordele, Ga., a corporation of Georgia Application October 30, 1946, Serial No. 706,555

5 Claims. (Cl. 88—14)

This invention relates to improvements in bottle or container inspection apparatus.

An object of the invention is to provide an improved bottle or container inspection apparatus which will be used in conjunction with bottling apparatus for automatically and intermittently stopping consecutive groups of bottles in front of an inspection light as they are carried by a conveyor belt from a bottle filling apparatus to a bottle crating station.

Another object of the invention is to provide an improved form of bottle or container stop apparatus including a rotary bottle or container engaging star wheel and a pivoted gate controlled latch mechanism operable by the bunching or grouping of the bottles or containers to automatically and intermittently stop consecutive groups of bottles or containers momentarily in front of an inspection light as they are carried by an endless conveyor from a bottle filling apparatus to a bottle crating station.

A further object of the invention is to provide an improved form of bottle or container stop apparatus including a gate controlled latch mechanism for permitting consecutive groups of bottles or containers to be released to pass on an endless conveyor to stop momentarily in front of an inspection light, together with a separate stop mechanism for holding the groups of bottles or containers in front of said inspection light and for releasing the groups of bottles or containers to pass along the endless conveyor to the bottle or container crating station, said last mentioned stop mechanism to be automatically and intermittently controlled and operated by said first mentioned stop mechanism.

A still further object of the invention is to provide an improved form of bottle or container stop apparatus used in conjunction with a bottling apparatus whereby groups of bottles or containers will be automatically and intermittently separated and stopped in consecutive groups at a light inspection station, said apparatus being highly efficient in operation and relatively inexpensive to manufacture and produce.

Other objects will appear as the description proceeds.

In the accompanying drawings which form a part of this application,

Figure 1 is a plan view of the improved bottle or container stop apparatus showing a group of bottles stopped in front of an inspection light;

Figure 2 is a plan view of the improved bottle or container stop mechanism showing the line of bottles checked by the star wheel and bunched together to force the pivoted latch control gate open;

Figure 3 is a side elevation of the improved bottle or container stop apparatus;

Figure 4 is a plan view of the improved bottle or container stop apparatus showing the bottles released with the inspected bottles or containers leaving their position in front of the inspection light and a following group of bottles or containers moving forward to be stopped in front of the inspection light;

Figure 5 is a sectional view taken on the line 5—5 of Figure 3;

Figure 6 is a view taken on the line 6—6 of Figure 5, and

Figure 7 is a sectional view taken on the line 7—7 of Figure 5.

Like characters of reference are used throughout the following specification and the accompanying drawings to designate corresponding parts.

In carrying out the invention, there is provided a bottle or container filling apparatus (not shown) and an endless conveyor belt 1 mounted upon a supporting frame 2 extending from said filling apparatus to pass in front of an inspection light generally denoted by the reference numeral 3, and terminating at a point where the filled and inspected bottles or containers will be crated for shipment.

Horizontally disposed spaced guide strips or rails 4 are supported by the spaced vertical arms 5 secured in any desired manner upon the conveyor supporting frame 2, serving to guide the bottles or containers 6 disposed upon the conveyor belt 1 and to prevent the same from falling from said belt.

A bottle or container inspection station will be provided along one side of the conveyor frame 2, consisting of an elongated reflector 7 suitably supported on a level with the filled bottles or containers 6 as they are carried by the endless belt or conveyor 1 from the filling apparatus (not shown) to the bottle or container crating end of the conveyor, said reflector supporting the vertically spaced sockets 8 and 9 in its opposite ends, between which the fluorescent light bulbs 10 are disposed and connected with a source of electrical energy (not shown).

The guide strips or rails 4 are interrupted at a point between the filling apparatus (not shown) and the inspection light, the space therebetween, being filled with a gate member 11 hinged at 12 to the adjacent ends of said guide strips or rails 4, the purpose of which will be hereinafter described in detail.

The automatic bottle or container stop apparatus or mechanism includes a star wheel 13 having eight points 14 and eight bottle or container receiving recesses 15, or any desired number of points and recesses, the same being mounted upon a vertical shaft 16 which is rotatably mounted between the parallel side arms 22 and 23 of the U-shaped bracket member 17 secured by the bolts 18 extending through its central portion to the conveyor frame 2. The star wheel 13 is mounted on a horizontal plane with the points 14 thereof extending inwardly above the conveyor belt 1 and in spaced relation thereto, whereby the bottles or containers 6 are positively engaged by the star wheel as they are carried by the conveyor belt 1 from the filling apparatus (not shown) to a position in front of the inspection light.

The vertical shaft 16 supports the small spur gear 19 which is meshed with a spur gear 20 of twice its size mounted upon the shaft 21 mounted between the side arms 22 and 23 of the U-shaped bracket member 17 to extend parallel to the vertical shaft 16. The shaft 21 extends through the bracket arm 23 and below the same to support the disk or wheel 24 on its lowermost end. A raised stop or lug 25 is formed on the upper surface of the disk or wheel 24 and is adapted to cooperate with a latch arm 26 connected to the hereinafter described linkage and controlled by the outward movement of the gate member 11.

A longitudinally disposed rod 27 is supported in the bearing 28 secured to the side of the conveyor frame 2 and is bent at its rear end to extend upwardly then outwardly, and again upwardly as at 29, terminating in the inwardly directed finger 30 which is adapted to be engaged by the hinged gate member 11 when the same is swung outwardly by the bottles 6 crowding together when their forward motion on the conveyor belt 1 is checked by the latch arm 26 adjustably secured to the forward end of the rod 27 by means of the set bolt 26', said arm dropping downwardly in front of the stop 25 on the wheel 24, thereby preventing rotation of the star wheel mechanism. The gear 20 being twice the size of the intermeshed gear 19 and having twice the number of teeth will, when the wheel 24 is released by the operation of the gate 11 causing the latch arm 26 to raise above the stop lug 25, permit the star wheel 13 to make two complete revolutions while the wheel 24 is making one revolution, thus allowing sixteen filled bottles or containers 6 to be carried by the conveyor belt 1 to a position in front of the inspection light 3, where the foremost bottle or container 6 will engage the weighted stop arm 31 extending transversely of and slightly above the conveyor belt 1. The stop arm 31 will be secured to one end of the rod or shaft 32 rotatably mounted in the spaced bearing brackets 33 and 34 secured to the side of the conveyor frame 2. A vertically extending trip arm 35 is secured to the opposite end of the rod or shaft 32 and is adapted to engage and close the arcuate bottle actuated finger 37 pivotally mounted on the vertical pivot pin 36 supported in the bracket or housing 38 mounted on the side of the conveyor frame 2. The force or movement of the bottles 6 upon the conveyor belt 1 will open said bottle actuated finger 37. An adjustable weight 39 is attached to the rod 27 to control the latch 26 which stops lug 25 causing the gate 11 to open easy or hard, as desired.

From the foregoing description, it will be apparent that the mode of operation of the improved bottle or container stop apparatus is as follows: Assuming that the star wheel 13 was held stationary by the latch arm 26 engaging the raised stop or lug 25, with a point 14 of said wheel positively stopping and holding the forwardmost bottle or container 6, with other bottles or containers 6 being lined up behind said first mentioned bottle or container by the movement of the conveyor belt 1 until the bottles or containers 6 bunch or group together, as shown in Figure 2, to force the gate 11 open to engage the inner end 30 of the arm 29, thus causing rod 27 to rotate to raise the latch arm 26 momentarily from its position in front of the stop or lug 25 on the wheel 24, permitting the gear 20 to make one revolution before the stop or lug 25 again is engaged by the latch arm 26, and the star wheel 13 to make two complete revolutions to advance another group of sixteen bottles or containers 6 on the conveyor belt 1 towards the inspection light 3. The bottles or containers 6 will force the finger 36 outwardly to engage the trip arm 35 to force the same outwardly and to simultaneously raise the weight arm 31 upwardly to permit the sixteen bottles or containers 6 which were momentarily stopped in front of the inspection light 3 to move on the conveyor belt 1 to the bottle or container crating station, the said weight arm 31 again dropping down transversely of the conveyor belt 1 after the inspected bottles or containers 6 have moved on, to stop the next group of bottles or containers 6 in front of the inspection light 3. This intermittent action of allowing groups of bottles to pass to and momentarily stop in front of the inspection light is entirely automatic and continuous as long as there are bottles being fed upon the conveyor belt 1 and the machine is kept running.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

1. A container conveyor system including a supporting frame, an endless conveyor associated thereon for delivering a plurality of containers to a station adjacent the discharge end of said endless conveyor, inspection means at said station, a bracket fixed to said supporting frame, vertical shafts rotatably carried by said bracket, a star wheel on the upper end of one of said shafts overlying said endless conveyor and engageable with said containers, a stop wheel having a stop lug thereon secured to the lower end of one of said shafts, a hinged gate adjacent said endless conveyor, an actuating rod rotatably supported upon said supporting frame, a finger carried by one end of said rod and disposed adjacent said gate, a latch arm on the other end of said rod intermittently engageable with the stop lug on said stop wheel and releasable by the crowding of the bottles against said gate causing the same to move outwardly to actuate said finger for releasing said latch arm, thereby permitting the release of a predetermined number of bottles to travel along said endless conveyor to a stationary position at said inspection station, means for retaining said bottles momentarily at the inspection station, and an arcuate bottle actuated finger pivotally supported on said supporting frame for releasing containers at said station.

2. A bottle or container inspection apparatus including a supporting frame, an endless conveyor supported thereon for delivering a plurality of containers to a station adjacent the discharge end of said endless conveyor, inspection means at said station, a U-shaped bracket fixed to said supporting frame, parallel vertical shafts rotatably mounted between the arms of said bracket, a star wheel on the upper end of one of said shafts overlying said endless conveyor and engageable with said containers when disposed upon said endless conveyor, intermeshed reduction gears on said shafts, a stop wheel having a stop lug thereon secured to the lower end of the other of said shafts having a one to two ratio or rotation with said star wheel, a hinged gate adjacent said endless conveyor, an actuating rod rotatably supported upon said supporting frame, a gate actuated finger on one end of said rod, a latch arm on the other end of said rod intermittently engageable with the stop lug on said stop wheel releasable by the crowding of the containers against said gate causing the same to move outwardly to actuate said finger for releasing said latch arm, thereby permitting the release of a predetermined number of containers to travel along said endless conveyor to a stationary position at said inspection station, an arcuate bottle actuated finger pivotally supported on said supporting frame movable over said endless conveyor, a second rod rotatably supported on said supporting frame at said inspection station, a weighted stop arm on one end of said rod movable across said endless conveyor to stop the movement of said containers when positioned in front of said inspection station, and a vertically extending trip arm on the opposite end of said rod engageable with and operable by the movement of said container actuated finger for releasing the containers in front of the inspection station for movement along the endless conveyor as said star wheel is actuated to permit another set of containers to move along the endless conveyor to stop at said inspection station.

3. A container conveyor system including a supporting frame, an endless conveyor supported thereon for delivering a plurality of containers to an inspection station adjacent the discharge end of said endless conveyor, inspection means at said station, means for retaining a predetermined number of the containers in a stationary position at the said station, a star wheel overlying said conveyor and spaced forwardly of the station for retaining another group of the containers in a stationary position, stop means associated with said star wheel, a pivoted gate disposed adjacent said conveyor, release means for said stop means actuated by movement of the gate to release the star wheel, said gate being moved by the crowding thereagainst of the containers held by the star wheel, a release means for the retaining means at the inspection station, said last release means including a member transversely disposed above the conveyor and engaged by the containers moving toward the inspection station upon release of the star wheel stop means.

4. A container conveyor system including a supporting frame, an endless conveyor supported thereon for delivering a plurality of containers to an inspection station adjacent the discharge end of the conveyor, inspection means at said station, means for retaining a group of the containers in a stationary position at the said station, said means including a stop arm, release means for said arm including a rotating rod associated with said arm and a lever carried by said rod and transversely disposed above the conveyor, said lever being actuated by a following group of containers, means for retaining said following group of containers in a stationary placement spaced from the said station, said means including a star wheel overlying said conveyor, means for braking said star wheel and release means therefor, said release means including a gate hinged adjacent said conveyor and actuated by the crowding thereagainst of the containers held by the star wheel.

5. A container conveyor system including a supporting frame, an endless conveyor supported thereon for delivering a plurality of containers to a station adjacent the discharge end of the conveyor, inspection means at said station, a stop arm disposed at said station for momentarily halting the advance of a group of containers therebeyond, release means for said arm including a rod, a trip arm disposed transversely on the conveyor and carried by the rod, said trip arm being actuated by a second group of containers, a star wheel overlying said conveyor for momentarily holding the second group of containers from engagement by the trip arm, braking means for said star wheel and release means for said braking means including a hinged gate disposed adjacent said conveyor, said gate being actuated by containers of the second group.

EDWIN H. BRITT.

REFERENCES CITED

The following references are of record in the file of this patent:

UNITED STATES PATENTS

| Number | Name | Date |
|---|---|---|
| 1,679,402 | Brown | Aug. 7, 1928 |
| 1,947,142 | Ward et al. | Feb. 13, 1934 |
| 2,052,840 | Nussbaum | Sept. 1, 1936 |
| 2,236,945 | Gibbs | Apr. 1, 1941 |
| 2,259,748 | Hullhorst | Oct. 21, 1941 |
| 2,296,027 | Gettelman | Sept. 15, 1942 |